(No Model.)
G. W. TINSLEY.
HOSE COUPLING.
No. 448,693. Patented Mar. 24, 1891.
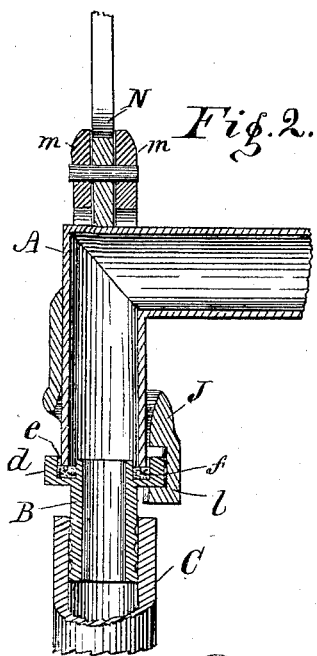
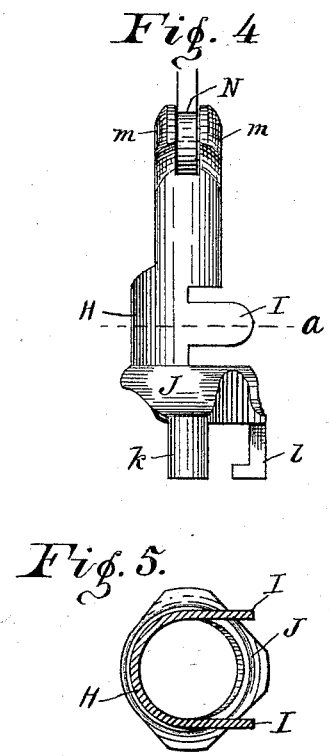
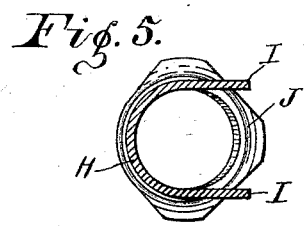
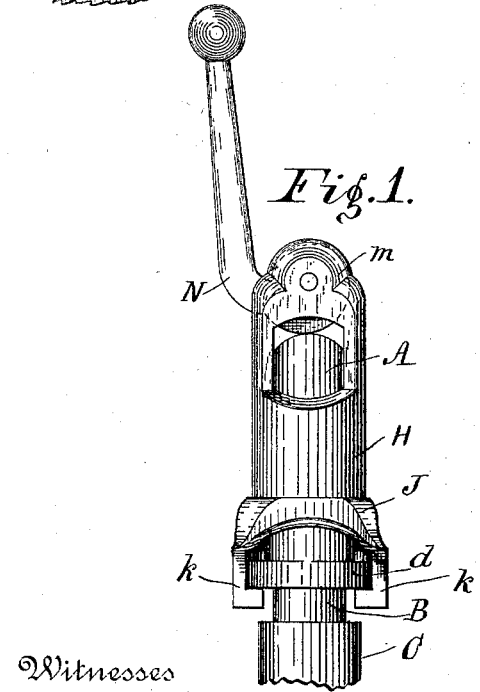
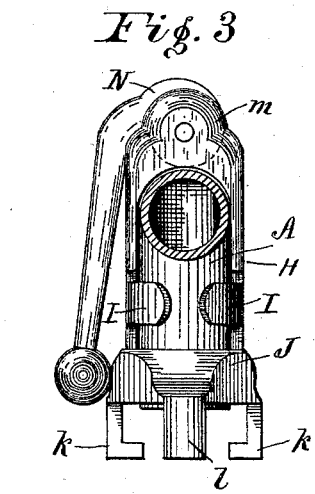
Witnesses
V. M. Hood.
A. M. Hood.
Inventor:
George W. Tinsley
By His Attorney
H. P. Hood.

UNITED STATES PATENT OFFICE.

GEORGE W. TINSLEY, OF COLUMBUS, INDIANA.

HOSE-COUPLING.

SPECIFICATION forming part of Letters Patent No. 448,693, dated March 24, 1891.

Application filed July 30, 1890. Serial No. 360,381. (No model.)

*To all whom it may concern:*

Be it known that I, GEORGE W. TINSLEY, a citizen of the United States, residing at Columbus, in the county of Bartholomew and State of Indiana, have invented a new and useful Improvement in Hose-Couplings, of which the following is a specification.

My invention relates to an improved means for coupling a hose to a fixed discharge-pipe, as a lawn-hydrant.

The object of my improvement is to provide a coupling device which may be easily secured to the discharge-pipe so as to become a permanent fixture thereon, and which shall operate to secure the hose to the discharge-pipe quickly and without any twisting movement of the hose, all as hereinafter fully set forth.

The accompanying drawings illustrate my invention.

Figure 1 represents a front elevation showing the hose coupled. Fig. 2 represents a central longitudinal section of the same. Fig. 3 represents a rear elevation, the hose having been uncoupled and removed. Fig. 4 represents a side elevation of the clamp before it is secured to the discharge-pipe. Fig. 5 represents a transverse section at $a$, Fig. 4.

A is a straight cylindrical pipe-elbow, forming the end of the discharge-pipe of a lawn-hydrant or other source of water-supply.

B is a tubular fitting adapted to be inserted in the end of the hose C, and provided with an annular head $d$, in which is formed an annular recess $e$, in which an elastic packing $f$ is secured.

For the purpose of clamping the fitting B against the end of the elbow A, I provide a casting, preferably of brass, consisting of a central semi-cylindrical sleeve H, adapted to receive and to slide easily upon the vertical portion of the discharge-pipe A, and having projecting from its open side a pair of lugs I I, adapted to be bent around the elbow so as to retain the sleeve thereon, a lower cylindrical portion J, having three depending hooks $k\ k$ and $l$, adapted to receive and hold the head $d$ of the hose fitting B concentric with sleeve H, and terminating at the upper end in a pair of lugs $m\ m$. Pivoted between the lugs $m\ m$ is a cam-lever N. The clamp thus formed is easily secured on the pipe-elbow A by inserting the depending member of the elbow in sleeve H and through the cylindrical portion J, and then bending the lugs I inward so as to clasp the elbow, as shown in Fig. 3.

In operation, when the cam-lever N is depressed, as in Fig. 3, the periphery of the cam at its minor diameter rests upon the upper side of the pipe-elbow, and the hooks $k\ k$ and $l$ project far enough below the end of the elbow to permit the head $d$ of the hose-fitting B to enter them and pass below said end. It will be observed that the hooks $k\ k$ are arranged diametrically opposite each other, so as to permit the full diameter of the head to pass between them, while hook $l$ is arranged at right angles to the other two, so as to form a stop for the head when it is concentric with the open end of the pipe-elbow. When the lever N is raised to the position shown in Figs. 1 and 2, its major diameter is presented to the elbow, and fitting B is drawn upward and closely clamped against the open end of the elbow, the packing $f$ forming a tight joint therewith.

I claim as my invention—

1. In a hose-coupling, the combination, with the pipe-elbow and the hose-fitting having an annular head, of the sleeve adapted to receive one member of the elbow and to slide longitudinally thereon, said sleeve being provided at one end with hooks which project beyond the end of the elbow and are adapted to engage said annular head, and the cam-lever pivoted to the opposite end of the sleeve and arranged to rest upon the elbow, whereby the hose-fitting is clamped to the pipe-elbow, in the manner set forth.

2. As a new article of manufacture, the hose-coupling clamp consisting of the semi-cylindrical sleeve H, having the lugs I I projecting from its open side, the cylindrical portion J, having hooks $k\ k$ and $l$, lugs $m\ m$, and the cam-lever N pivoted thereto, all combined and arranged to co-operate with a pipe-elbow and a hose-fitting having an annular head, substantially as and for the purpose set forth.

GEORGE W. TINSLEY.

Witnesses:
 H. P. HOOD,
 V. M. HOOD.